United States Patent
Chunduri et al.

(10) Patent No.: US 9,407,534 B2
(45) Date of Patent: Aug. 2, 2016

(54) ENHANCED PROCEDURE TO COMPUTE LFAS WITH IGP MAX METRIC

(71) Applicant: Telefonaktiebolaget L M Ericsson (publ), Stockholm (SE)

(72) Inventors: Uma S. Chunduri, Fremont, CA (US); Wenhu Lu, San Jose, CA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 66 days.

(21) Appl. No.: 14/288,211

(22) Filed: May 27, 2014

(65) Prior Publication Data

US 2015/0350059 A1   Dec. 3, 2015

(51) Int. Cl.
*H04L 12/705* (2013.01)
*H04L 12/707* (2013.01)
*H04L 12/803* (2013.01)
*H04L 12/721* (2013.01)
*H04L 12/715* (2013.01)

(52) U.S. Cl.
CPC .............. *H04L 45/18* (2013.01); *H04L 45/12* (2013.01); *H04L 45/124* (2013.01); *H04L 45/22* (2013.01); *H04L 47/122* (2013.01); *H04L 45/64* (2013.01)

(58) Field of Classification Search
None
See application file for complete search history.

(56) References Cited

U.S. PATENT DOCUMENTS

| | | | | |
|---|---|---|---|---|
| 7,046,662 B1 * | 5/2006 | Saluja | ...................... | H04L 45/02 370/389 |
| 7,869,359 B2 * | 1/2011 | Kohler | ...................... | H04L 45/12 370/231 |
| 8,259,564 B1 * | 9/2012 | Gredler | ............... | G06F 11/2005 370/218 |
| 2004/0120266 A1 * | 6/2004 | Ko | ........................ | H04L 45/742 370/252 |

(Continued)

FOREIGN PATENT DOCUMENTS

EP   2675120 A1   12/2013

OTHER PUBLICATIONS

Ali, et al., "Node-ID Based Resource Reservation Protocol (RSVP) Hello: A Clarification Statement", Network Working Group, Network Working Group, Request for Comments: 4558, The Internet Society, (Jun. 2006), 7 pages.

(Continued)

*Primary Examiner* — Dung B Huynh
(74) *Attorney, Agent, or Firm* — Nicholson, De Vos, Webster & Elliot, LLP

(57) ABSTRACT

A method and implementing system calculates a loop free alternative (LFA) next hop as a backup for a primary path next hop for an interior gateway protocol (IGP). The method enables consideration of the LFA next hop where a link to the next hop has a reverse cost that has a maximum value. The method includes selecting a next candidate next hop from a set of candidate next hops in the network, checking whether a link to the next candidate next hop is an administratively allowable link, and checking whether the link has a maximum forward cost. The method further checks whether the link is bi-directional and computes the LFA using the next candidate next hop where the link is administratively allowable link, where the link does not have a maximum forward cost and where the link is bi-directional without consideration of reverse cost of the link.

25 Claims, 7 Drawing Sheets

(56) References Cited

U.S. PATENT DOCUMENTS

| | | | | |
|---|---|---|---|---|
| 2004/0246935 | A1* | 12/2004 | Joshi | H04L 45/00 370/338 |
| 2005/0073958 | A1* | 4/2005 | Atlas | H04L 45/00 370/238 |
| 2006/0209719 | A1* | 9/2006 | Previdi | H04L 12/4633 370/254 |
| 2007/0014251 | A1* | 1/2007 | Jabri | H04L 29/06027 370/310 |
| 2007/0183334 | A1* | 8/2007 | White | H04L 45/00 370/238 |
| 2007/0207728 | A1* | 9/2007 | Drakos | H04B 7/2041 455/12.1 |
| 2008/0205420 | A1* | 8/2008 | Srikrishna | H04W 40/12 370/401 |
| 2009/0144390 | A1* | 6/2009 | Previdi | H04L 45/18 709/217 |
| 2009/0238075 | A1* | 9/2009 | Mosko | H04L 45/00 370/238 |
| 2009/0252133 | A1* | 10/2009 | Watanabe | H04W 76/022 370/338 |
| 2009/0290497 | A1* | 11/2009 | Gibbings | H04L 45/00 370/242 |
| 2011/0044348 | A1* | 2/2011 | Kini | H04L 45/02 370/401 |
| 2012/0044811 | A1* | 2/2012 | White | H04L 45/02 370/238 |
| 2012/0051212 | A1* | 3/2012 | Xu | H04L 41/0659 370/223 |
| 2012/0075988 | A1* | 3/2012 | Lu | H04L 45/02 370/218 |
| 2013/0028073 | A1* | 1/2013 | Tatipamula | H04L 41/12 370/218 |
| 2013/0028142 | A1* | 1/2013 | Beheshti-Zavareh | H04L 45/22 370/255 |
| 2013/0051217 | A1* | 2/2013 | So | H04L 45/18 370/217 |
| 2013/0259056 | A1* | 10/2013 | Kotrabasappa | H04L 45/24 370/401 |
| 2014/0036729 | A1* | 2/2014 | Thubert | H04L 45/18 370/255 |
| 2014/0219651 | A1* | 8/2014 | Ruffini | H04J 14/02 398/33 |
| 2014/0250240 | A1* | 9/2014 | Schell | H04L 61/2535 709/245 |
| 2015/0146720 | A1* | 5/2015 | Subramanian | H04L 45/121 370/390 |
| 2015/0180705 | A1* | 6/2015 | Beheshti-Zavareh | H04L 45/64 370/218 |

OTHER PUBLICATIONS

Andersson, L., et al., "LDP Specification", Network Working Group, Request for Comments: 5036, (Oct. 2007), 135 pages.
Babiarz, J., et al., "Configuration Guidelines for DiffServ Service Classes", Network Working Group, Request for Comments: 4594, The Internet Society, (Aug. 2006), 57 pages.
Baker, F., et al., "A Differentiated Services Code Point (DSCP) for Capacity-Admitted Traffic", Internet Engineering Task Force (IETF), Request for Comments: 5865, (May 2010), 14 Pages.
Baker, F., et al., "Management Information Base for the Differentiated Services Architecture", Network Working Group, Request for Comments: 3289, The Internet Society, (May 2002), 116 pages.
Berger, L., "Generalized Multi-Protocol Label Switching (GMPLS) Signaling Resource ReSerVation Protocol-Traffic Engineering (RSVP-TE) Extensions", Network Working Group, Request for Comments: 3473, http://tools.ietf.org/html/rfc3473, (Jan. 2003), 42 pages.
Bernet, Y., et al., "An Informal Management Model for Diffsery Routers", Network Working Group, Request for Comments: 3290, The Internet Society, (May 2002), 56 pages.
Black, D., "Differentiated Services and Tunnels", Network Working Group, Request for Comments: 2983, The Internet Society, (Oct. 2000), 14 pages.
Black, D., et al., "Per Hop Behavior Identification Codes", Network Working Group, Request for Comments: 3140, The Internet Society, (Jun. 2001), 8 pages.
Blake, S., et al., "An Architecture for Differentiated Services", Network Working Group, Request for Comments 2475, The Internet Society, (Dec. 1998), 36 pages.
Borman, D., et al., "IPv6 Jumbograms", Network Working Group, Request for Comments: 2675, The Internet Society, (Aug. 1999), 9 pages.
Braden, et al., "Resource ReSerVation Protocol (RSVP)—Version 1 Functional Specification", Network Working Group, Request for Comments: 2205, (Sep. 1997), 112 pages.
Chan, K., et al., "Differentiated Services Quality of Service Policy Information Base", Network Working Group, Request for Comments: 3317, The Internet Society, (Mar. 2003), 96 pages.
Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.
Davie, B., et al., "An Expedited Forwarding PHB (Per-Hop Behavior)", Network Working Group, Request for Comments: 3246, The Internet Society, (Mar. 2002), 16 pages.
Deering, et al., "Internet Protocol, Version 6 (IPv6) Specification", Network Working Group, Request for Comments: 2460, The Internet Society, (Dec. 1998), 39 pages.
Eggert, L., et al., "Unicast UDP Usage Guidelines for Application Designers", Network Working Group, Request for Comments: 5405, IETF Trust, (Nov. 2008), 27 pages.
Fenner, B., et al., "Management Information Base for the User Datagram Protocol (UDP)", Network Working Group, Request for Comments: 4113, The Internet Society, (Jun. 2005), 19 pages.
Grossman, D., "New Terminology and Clarifications for Diffserv", Network Working Group, Request for Comments: 3260, The Internet Society, (Apr. 2002), 10 pages.
Hedrick, C., "Routing Information Protocol", Network Working Group; RFC 1058; Jun. 1988; 33 pages.
Heinanen, J., et al., "Assured Forwarding PHB Group", Network Working Group; RFC 2597; Jun. 1999; 11 pages.
Hopps, C., "Analysis of an Equal-Cost Multi-Path Algorithm", Network Working Group, Request for Comments: 2992, The Internet Society, (Nov. 2000), 8 pages.
Housley, "Using Advanced Encryption Standard (AES) CCM Mode with IPsec Encapsulating Security Payload (ESP)", Network Working Group, Request for Comments: 4309, The Internet Society, (Dec. 2005), 13 pages.
Information Sciences Institute, University of Southern C., "Transmission control protocol darpa internet program protocol specification", Sep. 1981, Request for Comments: 793, 91 pages.
Kent, et al., "Security Architecture for the Internet Protocol", Network Working Group, Request for Comments: 4301, The Internet Society, (Dec. 2005), 101 pages.
Kompella, et al., "Procedures for Modifying the Resource reSerVation Protocol (RSVP)", Network Working Group, Request for Comments: 3936, The Internet Society, (Oct. 2004), 7 pages.
Li, T., "IS-IS Extensions for Traffic Engineering", Network Working Group, Request for Comments: 5305, (Oct. 2008), 17 pages.
Malkin, G., "RIP Version 2", Network Working Group, Request for Comments: 2453, The Internet Society, (Nov. 1998), 39 pages.
Malkin, et al., "RIPng for IPv6", Network Working Group, Request for Comments: 2080, (Jan. 1997), 19 pages.
Moy, J., "OSPF Version 2", Network Working Group, Request for Comments: 2328, The Internet Society, (Apr. 1998), 244 pages.
Nichols, K., et al., "Definition of Differentiated Services Per Domain Behaviors and Rules for their Specification", Network Working Group, Request for Comments: 3086, The Internet Society, (Apr. 2001), 24 pages.
Nichols, K., et al., "Definition of the Differentiated Services Field (DS Field) in the IPv4 and IPv6 Headers", Network Working Group, Request for Comments: 2474, The Internet Society, (Dec. 1998), 20 pages.
Oran, David, "OSI ISIS Intradomain Routing Protocol", Network Working Group, Request for Comments: 1142, (Feb. 1990), 157 pages.

(56) References Cited

OTHER PUBLICATIONS

Polk, et al., "A Resource Reservation Protocol (RSVP) Extension for the Reduction of Bandwidth of a Reservation Flow", Network Working Group, Request for Comments: 4495, The Internet Society, (May 2006), 21 pages.

Postel, J., "User Datagram Protocol," Aug. 28, 1980, 3 pages, RFC: 768.

Rekhter, Y., et al., "A Border Gateway Protocol 4 (BGP-4)", Network Working Group, Request for Comments: 4271, (Jan. 2006), 104 pages.

Retana, A., et al., "OSPF Stub Router Advertisment", Network Working Group, Request for Comments: 3137, (Jun. 2001), 5 pages.

Rosen, et al., "BGP/MPLS IP Virtual Private Networks (VPNs)", Network Working Group, Request for Comments: 4364, The Internet Society, (Feb. 2006), 47 pages.

Shenker, et al., "Specification of Guaranteed Quality of Service", Network Working Group, Request for Comments: 2212, (Sep. 1997), 20 pages.

Socolofsky, T., et al., "A TCP/IP Tutorial", Network Working Group, Request for Comments: 1180, (Jan. 1991), 28 pages.

Thaler, et al., "Multipath Issues in Unicast and Multicast Next-Hop Selection", Network Working Group, Request for Comments: 2991, The Internet Society, (Nov. 2000), 9 pages.

Wroclawski, J., "Specification of the Controlled-Load Network Element Service", Network Working Group, Request for Comments: 2211, (Sep. 1997), 19 pages.

Wroclawski, J., "The Use of RSVP with IETF Integrated Services", Network Working Group, Request for Comments: 2210, (Sep. 1997), 33 pages.

Atlas, A., et al., "Basic Specification for IP Fast Reroute; Loop-Free Alternates", *Network Working Group, RFC 5286, Standards Track*, Sep. 2008, 32 pages., 32.

Callon, R., "Use of OSI IS-IS for Routing in TCP/IP and Dual Environments", http://tools.ietf.org/rfc/rfc1195.txt; Dec. 1990; 80 pages.

Li, T., "RFC 5305 IS-IS Extensions for Traffic Engineering", *Redback Networks, Inc.*, Oct. 2008, http://www.faqs.org/rfcs/rfc5305.html., Oct. 19, 2011.

\* cited by examiner

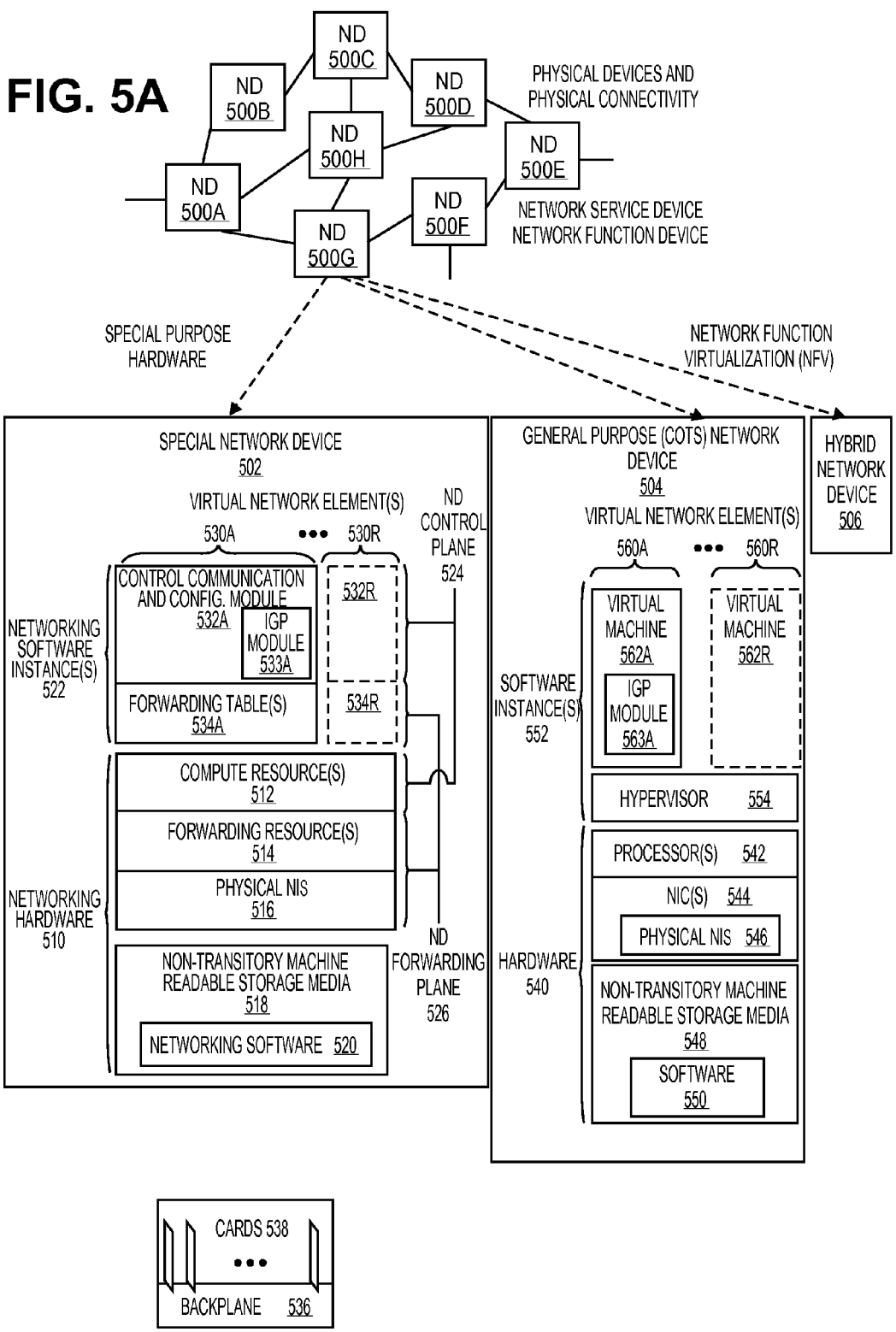

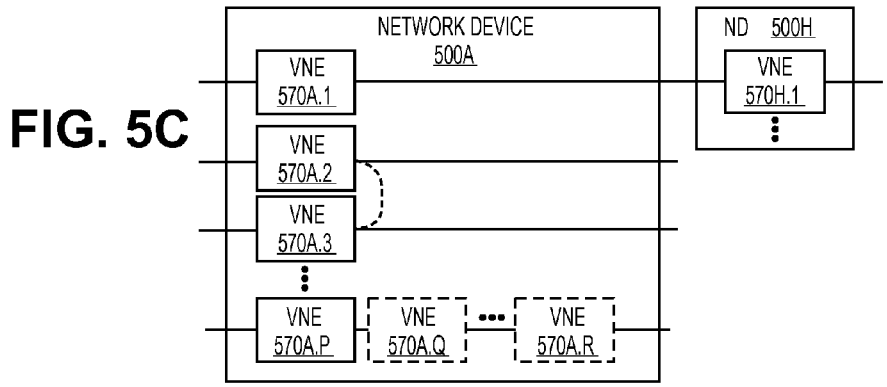
FIG. 5C
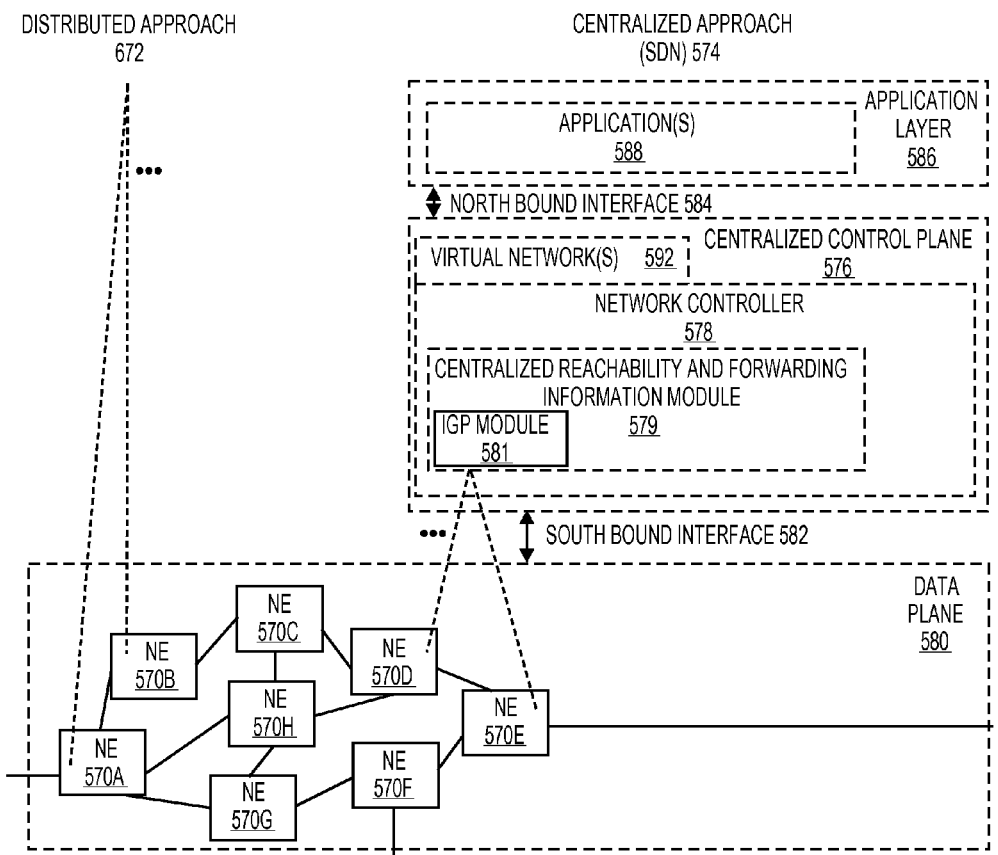
FIG. 5D
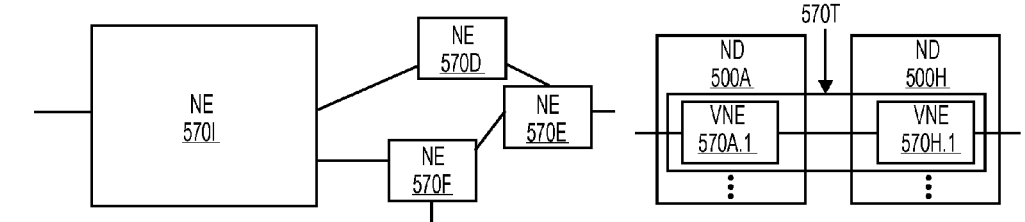
FIG. 5E
FIG. 5F

ENHANCED PROCEDURE TO COMPUTE LFAS WITH IGP MAX METRIC

FIELD

Embodiments of the invention relate to the field of interior gateway protocol (IGP) loop free alternative (LFA) computation. More specifically, the embodiments relate to the computation of LFA with relaxed link reverse cost requirements to enable the identification of an LFA for more paths.

BACKGROUND

An Interior Gateway Protocol (IGP) is a type of protocol used for exchanging routing information between gateways (i.e., network devices) within a network including a set of commonly controlled gateways (e.g., a set of corporate local area networks); this network can be referred to as an autonomous system. The exchanged routing information can be used to forward data across the autonomous system using network-level protocols like the Internet Protocol (IP).

Specific examples of IGPs include open shortest path first (OSPF), intermediate system to intermediate system (IS-IS), and routing information protocol (RIP). IGPs are not responsible for routing or exchanging routing information outside of their respective autonomous systems. Exterior or border gateway protocols are used to exchange routing information between autonomous systems and rely on IGPs to resolve routes within an AS.

The IGPs determine a set of paths from each network device in the autonomous system to each other network device in the autonomous system. A primary path is determined at each network device and the next hop to the destination is installed in the forwarding tables of the network device. However, in the case of failure of a next hop or link a secondary or alternative path is also determined to be utilized in the case of failure until the network device can recalculate a primary path based on the changed topology of the network. RFC 5286 [Basic Specification for IP Fast Reroute: Loop Free Alternatives] lays out a method to compute Loop Free Alternatives (LFA) that is applicable to Interior Gateway Protocols (IGPs) such as the intermediate system-intermediate system (IS-IS) protocol and the open shortest path first (OSPF) protocols. RFC 5286 defines a set of criteria that a next hop link or next hop node must meet to be eligible and selected as a next hop for an LFA path. In particular, sections 3.5 and 3.6 of RFC 5286 define criteria for identifying the next hop for an LFA path. This criterion includes a requirement that invalidates the links whose reverse metric is configured with a maximum link metric (as defined in for IS-IS in RFC 5305 or as defined in RFC 3137 for OSPF). If these criteria are strictly followed there are situations as described below, where the only potential alternative available which satisfies the basic loop free condition will not be considered as alternative.

SUMMARY

A method is implemented by a network device in a network having a plurality of nodes. The method calculates a loop free alternative (LFA) next hop as a backup for a primary path next hop for an interior gateway protocol (IGP). The method enables consideration of the LFA next hop where a link to the next hop has a reverse cost that has a maximum value. The method includes selecting a next candidate next hop from a set of candidate next hops in the network, checking whether a link to the next candidate next hop is an administratively allowable link, and checking whether the link has a maximum forward cost. The method further checks whether the link is bi-directional and computes the LFA using the next candidate next hop where the link is administratively allowable link, where the link does not have a maximum forward cost and where the link is bi-directional without consideration of reverse cost of the link.

A network device is provided in a network having a plurality of nodes. The network device implements a method to calculate a loop free alternative (LFA) next hop as a backup for a primary path next hop for an interior gateway protocol (IGP). The method enables consideration of the LFA next hop where a link to the next hop has a reverse cost that has a maximum value. The network element includes a non-transitory storage medium to store networking software, and a network processor communicatively coupled to the non-transitory storage medium. The network processor is configured to execute an IGP module. The IGP module is configured to select a next candidate next hop from a set of candidate next hops in the network, to check whether a link to the next candidate next hop is an administratively allowable link, and to check whether the link has a maximum forward cost. The IGP module is further configured to check whether the link is bi-directional and to compute LFA using the next candidate next hop where the link is administratively allowable link, the link does not have a maximum forward cost and the link is bi-directional without consideration of reverse cost of the link.

A control plane device is configured to implement at least one centralized control plane for a software defined network (SDN). The centralized control plane is configured to calculate a loop free alternative (LFA) next hop as a backup for a primary path next hop for an interior gateway protocol (IGP). The centralized control plane enables consideration of the LFA next hop where a link to the next hop has a reverse cost that has a maximum value. The control plane device includes a non-transitory storage medium to store centralized control plane software and an IGP module, and a processor communicatively coupled to the non-transitory storage medium. The processor is configured to execute the control plane software to implement the IGP module. The IGP module is configured to select a next candidate next hop from a set of candidate next hops in the network, to check whether a link to the next candidate next hop is an administratively allowable link, and to check whether the link has a maximum forward cost. The IGP module is further configured to check whether the link is bi-directional, and to compute LFA using the next candidate next hop where the link is administratively allowable link, the link does not have a maximum forward cost and the link is bi-directional without consideration of reverse cost of the link.

A computing device is configured to implement a plurality of virtual machines for implementing network function virtualization (NFV), wherein a virtual machine from the plurality of virtual machines is configured to calculate a loop free alternative (LFA) next hop as a backup for a primary path next hop for an interior gateway protocol (IGP). The NFV enables consideration of the LFA next hop where a link to the next hop has a reverse cost that has a maximum value. The computing device includes a non-transitory storage medium to store an IGP module, and a processor communicatively coupled to the non-transitory storage medium. The processor is configured to execute the IGP module. The IGP module is configured to select a next candidate next hop from a set of candidate next hops in the network, to check whether a link to the next candidate next hop is an administratively allowable link, to check whether the link has a maximum forward cost, to check whether the link is bi-directional, and to compute the LFA using the next candidate next hop where the link is administratively allowable link, the link does not have a maximum forward cost and the link is bi-directional without consideration of reverse cost of the link.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement the special-purpose network device 502 according to some embodiments of the invention.

FIG. 5C illustrates various exemplary ways in which virtual network elements (VNEs) may be coupled according to some embodiments of the invention.

FIG. 5D illustrates a network with a single network element (NE) on each of the NDs of FIG. 5A, and within this straight forward approach contrasts a traditional distributed approach (commonly used by traditional routers) with a centralized approach for maintaining reachability and forwarding information (also called network control), according to some embodiments of the invention.

FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention.

DESCRIPTION OF EMBODIMENTS

Figure 1:
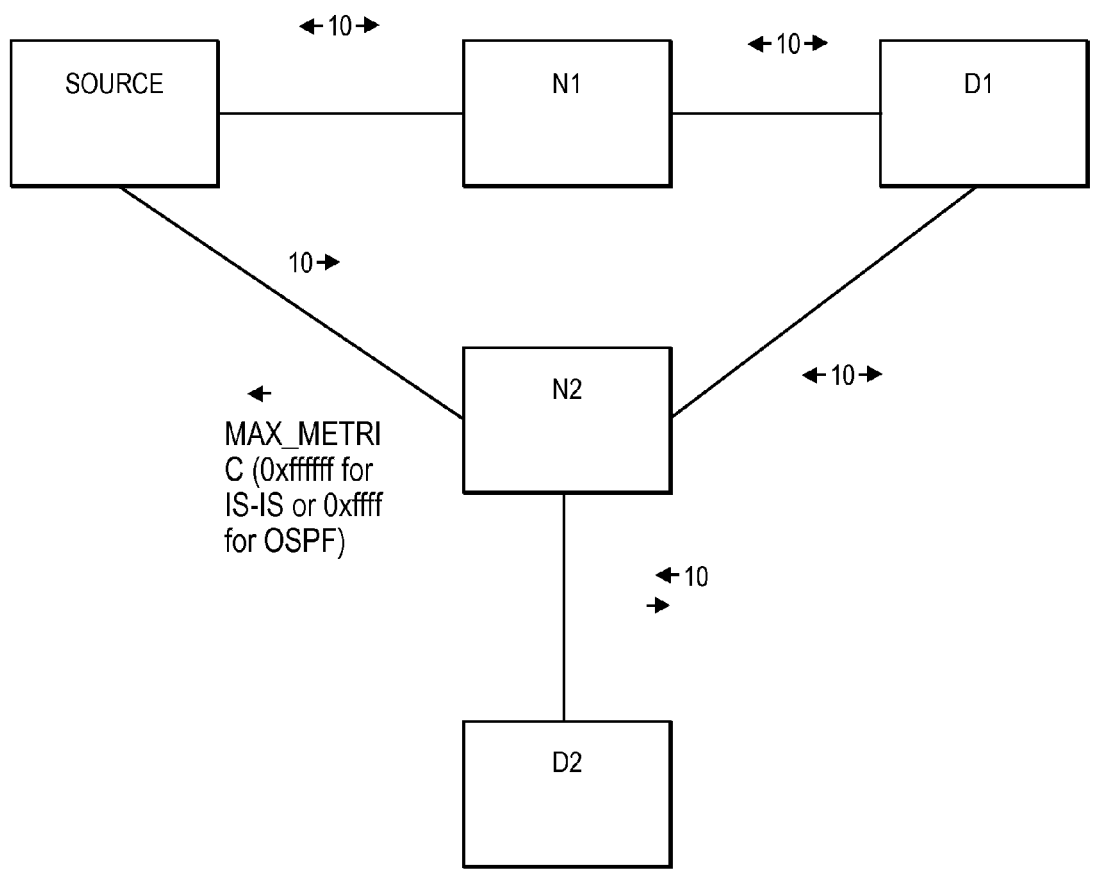
FIG. 1 is a diagram of one embodiment of a network topology having links with maximum metric reverse costs.

The following description describes methods and apparatus for computation of LFA for an interior gateway protocol (IGP) in an autonomous system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The processes for calculating the LFA for autonomous systems described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1 is a diagram of one embodiment of a network topology of an autonomous system having links that have a reverse cost that is a maximum link metric. A maximum link metric, as used herein, refers to a cost value associated with a link of the autonomous system. The value is designated as a maximum possible value for link cost. Link cost is a metric for indicating a relative or absolute measure of link length, bandwidth or similar measurement affecting the ability of the link to transmit data traffic. A link can transmit data traffic in one direction from a first node to a second node or can transmit data traffic in both directions between the nodes at each end of the link. A link that offers data transmission in one direction is referred to as 'uni-directional' and a link that provides data transmission in both directions is referred to as 'bi-directional.' A link can have a link cost in both a primary direction and a reverse direction that may differ from one another. Where a maximum link value is assigned, the actual value itself can vary depending on the IGP protocol, both intermediate system to intermediate system (IS-IS) and open shortest path first (OSPF) define different maximum link metric values.

The example network topology is provided by way of example and not limitation to illustrate the LFA computation process. The example network illustrates the problem of the only available alternate path for a destination (D1) not being identified and designated as an LFA under the current RFC 5286 exclusions and criteria.

In the example network, there are five IGP (e.g., IS-IS/OSPF) capable networks nodes. Specifically, the five nodes have been labeled as a source node (S), first intermediate node (N1), second intermediate node (N2), first destination node (D1) and second destination node (D2) are interconnected with the costs as indicated. Cost "ΘX→" indicates the same bidirectional cost of the link between the 2 nodes and "ΘX" or "X→" indicates the corresponding value of the link cost provisioned in the direction indicated. Metric value "0xffffff" (or $2^{24}-1$) is the maximum possible link metric possible using popular or widely utilized metrics [RFC 5305] for IS-IS and 0xffff or "LSInfinity" is the maximum possible link metric in case of OSPF (RFC 3137).

In the example, the link from the second intermediate node N2 to the source node (S) is set to MAX_METRIC or 0xffffff/$2^{24}-1$ for IS-IS and 0xffff for OSPF, while the metric of the other direction is 10 as shown). This maximum metric value can be utilized or assigned by a network operator or administrator. The use of the maximum metric can be due to any factor of concern to the network operator or administrator, examples can include (1) link maintenance or (2) traffic engineering (TE), for example as described in RFC 5305, Section 3, Page 4 for TE.

The RFC 5305 states that "If a link is advertised with the maximum link metric ($2^{24}-1$), this link MUST NOT be considered during the normal SPF computation. This will allow advertisement of a link for purposes other than building the normal Shortest Path Tree. An example is a link that is available for traffic engineering, but not for hop-by-hop routing." In this case before any failure in the network occurs, the source node (S) routing table includes entries for the destination nodes D1 and D2 where (→ represents "via"), such that the first entry is (1) D1→N1 with path cost 20, and the second entry is (2) D2→N2 with path cost 20.

In this example, traffic destined to D2 continues to be forwarded via N2 with path cost (10+10) even though one of the links in reverse path to source, is provisioned with MAX_METRIC (0xffffff/$2^{24}-1$ for IS-IS and 0xffff/LSInfinity for OSPF).

With these primary paths installed in the forwarding table, the computation of alternative paths as described in RFC 5286 can be executed. When computing the alternative path for destination node D1, neighboring intermediate node N2 can't be utilized as a valid alternative next hop even though the criteria of "Inequality1" in page 4 of the RFC 5286 is satisfied and it can be readily seen from the topology that traffic can reach D1 via N2.

Inequality 1 of RFC 5286 states:

$$\text{Distance\_opt}(N,D) < \text{Distance\_opt}(N,S) + \text{Distance\_opt}(S,D)$$

where Distance_opt(x, y) is a function that determines an optimal path from node x to node y and returns a number of hops for that path. If intermediate node N2 is a neighboring node and D1 is the destination, then the above inequality is completely satisfied in the illustrated topology, with the result of the functions providing: 10<30+20, which is true, thereby meeting the criteria.

However, because of Section 3.5 and Section 3.6 of RFC 5286 (with the relevant portion quoted below) the intermediate node N2, which is the only potential alternative, can't be eligible as a next hop of a loop free alternative (LFA) path for destination node D1.

Section 3.5 of RFC 5286 states:—

"...For computing an alternate, a router MUST NOT use an alternate next-hop that is along a link whose cost or reverse cost is LSInfinity (for OSPF) or the maximum cost (for IS-IS) or that has the overload bit set (for IS-IS)."
...
"If a link or router that is costed out was the only possible alternate to protect traffic from a particular router S to a particular destination, then there should be no alternate provided for protection."

Section 3.6 of RFC 5286 states:—

" 3. If H_h.link is administratively allowed to be used as an Alternate, and the cost of H_h.link is less than the maximum, and the reverse cost of H_h is less than the maximum, and H_h.neighbor is not overloaded (for IS-IS), and H_h.link is bidirectional, then H_h can be considered as an alternate. Otherwise, skip it and continue to the next candidate next-hop."

The reasoning behind the requirements of RFC 5286 that does not permit using the link for passing alternate traffic if the MAX_METRIC cost is present in the reverse direction is incorrect. The reasoning is incorrect as can be seen in this example topology of a network or autonomous system, because even before the failure, this link and path is still being used for forwarding traffic from the source node S to the destination node D2 along the primary path.

Nonetheless, due to these requirements of RFC 5286, the only possible alternative next hop and LFA via intermediate node N2 can't be used for destination node D2 in the above example network topology or autonomous system. The embodiments of the invention overcome these deficiencies of the prior art by removing this restriction as part of the LFA computation as set forth below with regard to the LFA process described in relation to FIG. 2. The improved LFA calculation process described herein below provides the principle advantage of increasing the coverage in the network or autonomous system, in particular in the cases where a link or set of links of a particular network node is set to the maximum link cost metric. This improvement in coverage is obtained without violating the core principles of LFA requirements as set forth in RFC 5286.

Figure 2:
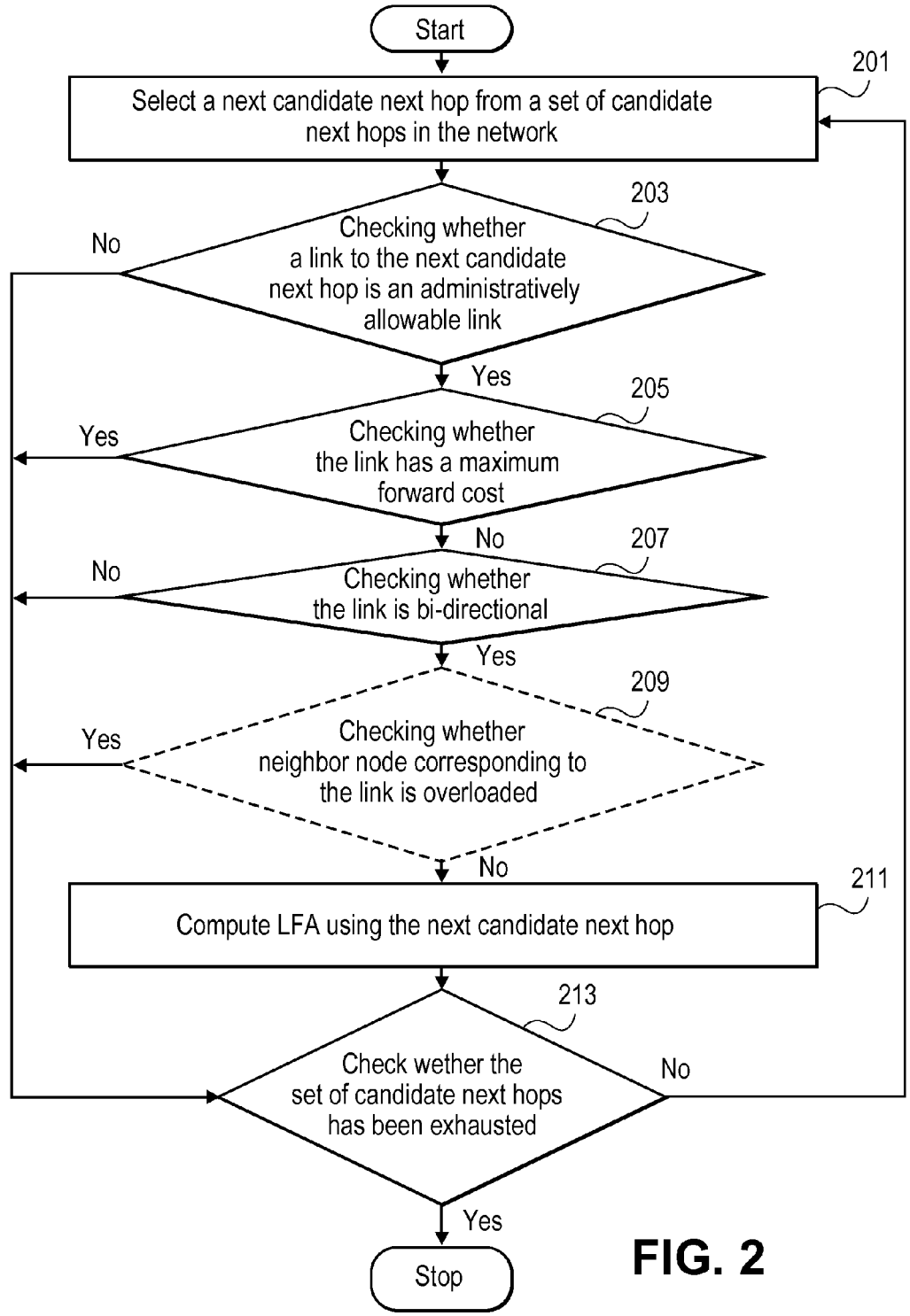
FIG. 2 is a flowchart of one embodiment of a LFA computation process for routes in an autonomous system.

FIG. 2 is a flowchart of one embodiment of a process for improved coverage in LFA computation. LFA computation is part of an overall process for building a forwarding table for the handling of data traffic within a network, autonomous system or network domain. The IGP process first exchanged link state information that enables all of the nodes within the network to determine the topology of the network. Using this topology a set of paths from each node to every other node is determined and the optimal next hops of these paths are recorded in the forwarding tables of the respective network nodes, which are each network devices. The paths and their next hops are the primary paths to their respective destinations. With the primary destinations determined, the process then determines alternative paths, in this case LFAs to be utilized in case of failure along the primary path. Whenever LFA computation is done i.e., while forming the Shortest Path Tree (SPT), rooted at each neighbor of a source node, for each destination encountered, a check of the inequalities is made as specified in RFC 5286 (per operator policy and as applicable from inequality 1 to 4).

The process described herein is based on the algorithm proposed in RFC 5286, section 3.6, however one skilled in the art would understand that one can use similar steps and processes to achieve the same results. In each implementation however, when a neighbor interface is checked for administrative eligibility or validity, the reverse cost of the link and the check to determine whether the link is eligible if its value is MAX_METRIC (0xffffff for IS-IS and 0xffff for OSPF) can be ignored or omitted. Altering the process in this manner is directly contrary to the requirements of RFC 5286 Section 3.6 point 3 in Page 16. However, this change in this process will automatically yield the correct LFA, which as noted in the above example was the determination of intermediate node N2 as a next hop of an alternate path for destination node D1.

In one embodiment, the process begins with the selection of a next candidate next hop from a set of candidate next hops in the network or autonomous system (Block 201). In most cases the set of candidate next hops encompasses all of the neighboring nodes of the source node that is the network device that is executing this process. As with the general process for path calculation, the process is a deterministic and distributed process with each node in the network implemented as a network device and responsible for exchanging the link state information such that each node determines the same network topology and using the network topology determines the same primary and LFA paths between nodes. Each node then updates its forwarding tables accordingly. This process iterates through each of the neighboring nodes as the set of candidates to identify the LFA path and next hop.

For the selected candidate next hop, the process checks whether the candidate is designated as an administratively allowable link (Block 203). An administrator can designate any link as being impermissible for use in path finding. This check enforces this administrative decision. If the link is administratively inadmissible, then the process continues on to the check whether any further candidate next hops remain in the set to be considered (Block 213). If all candidate nodes have been considered then the process completes. If the link is not administratively inadmissible then the process continues to the next check.

The process checks whether the link to the next candidate next hop node has a maximum forward cost (Block 205). If a forward link cost is a maximum metric link value, then the RFC 5286 requirements specify that the link and next hop are to be excluded for LFA consideration as the maximum metric link value is defined to be treated as though the link is not viable. The maximum metric link cost can be utilized by an administrator to shape traffic patterns or can be similarly utilized. If the link has the maximum metric link value, then the process continues on to the check whether any further candidate next hops remain in the set to be considered (Block 213). If all candidate next hops have been considered then the process completes. If the link is not a maximum metric link value, then the process continues to the next check.

The process checks whether the link to the next candidate next hop is bi-directional (Block 207). The RFC 5286 requirements specify that the link to the next hop is to be excluded for LFA consideration unless the link is a bi-directional link. If the link is not bi-directional, then the process continues on to the check whether any further candidate nodes remain in the set to be considered (Block 213). If all candidate next hops have been considered then the process completes. If the link is bi-directional, then the process continues to the next check.

In one optional embodiment, the process checks whether the link to the next candidate next hop node overloaded (Block 209). If the corresponding neighboring node of the link is overloaded, then RFC 5286 requirements specify that the link and next hop are to be excluded for LFA consideration as the overloaded node is not a viable alternative because its heavy load would prevent it from properly servicing the data traffic from the source node. In one embodiment, this check is limited to IS-IS implementations of the IGP. If the link is overloaded, then the process continues on to the check whether any further candidate nodes remain in the set to be considered (Block 213). If all candidate nodes have been considered then the process completes. If the link is not a maximum metric link value, then the process continues.

In cases where the next candidate next hop meets each of the checks, then the process performs the LFA computation (Block 211) using the next candidate next hop node as a root for the SPT computation to identify all of the destination nodes that can be reached through the next candidate next hop node and to update the forwarding tables accordingly consistent with the other requirements of RFC 5286 for determining LFAs. After completion of the LFA computation, the process then checks whether all candidate next hops have been exhausted (Block 213). If all candidate next hops have been processed, then the process completes. However, if additional candidate next hops remain in the set to be processed, then the process continues by selecting the next candidate next hop from the set of candidate next hops (Block 201).

Figure 3:
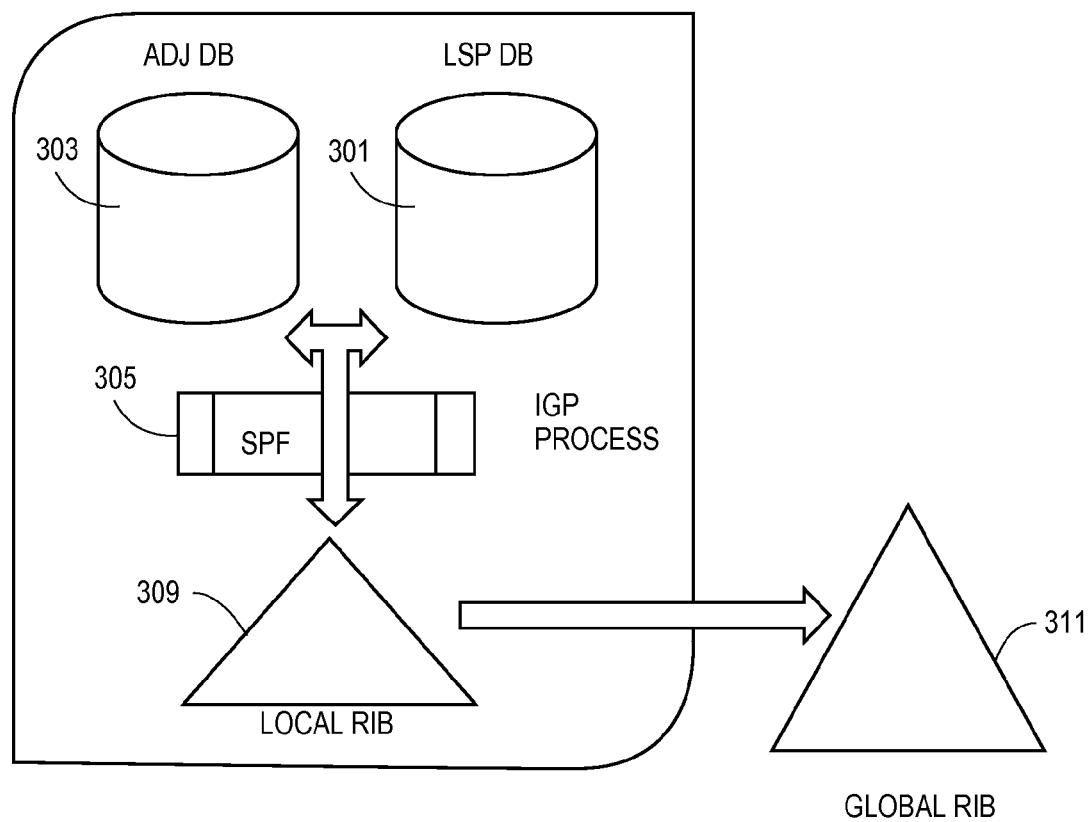
FIG. 3 is a diagram of the basic components of the IGP process.

FIG. 3 is a diagram of the basic components of the IGP process. The components of the network device that are utilized in the IGP process include an adjacency (ADJ) database 303, a link state protocol (LSP) database 301, a shortest path first (SPF) 305 or similar routing process, and a local RIB 309. The adjacency database 303 tracks adjacency information received from neighboring nodes connected through the physical ports and links of the network device. The link state protocol database 301 tracks the topology of the network or autonomous system in which the network device is situated, which is based on exchange of link state packets. A shortest path first 305 or similar route computation algorithm processes the link state protocol database 301 to determine forwarding information that is stored in the local routing information base 309. In some embodiments, the local routing information base is synchronized or downloaded to a global routing information base 311 that is shared by all components of the network device such as line cards and similar components or that may be shared with other network devices in the network or autonomous system.

Figure 4:
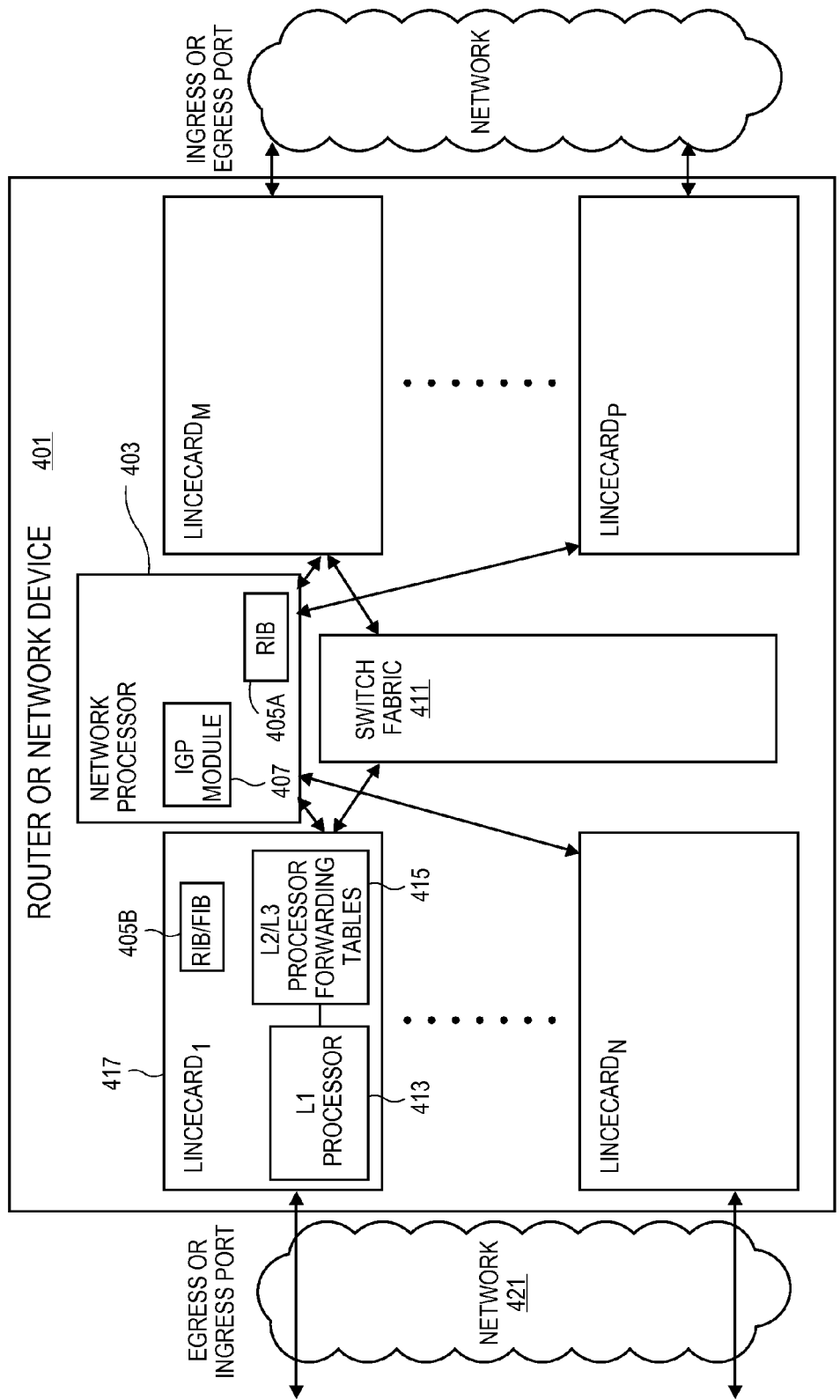
FIG. 4 is a diagram of one embodiment of a network device implementing the LFA computation process for routes in an IGP network area/domain.
Figure 6:
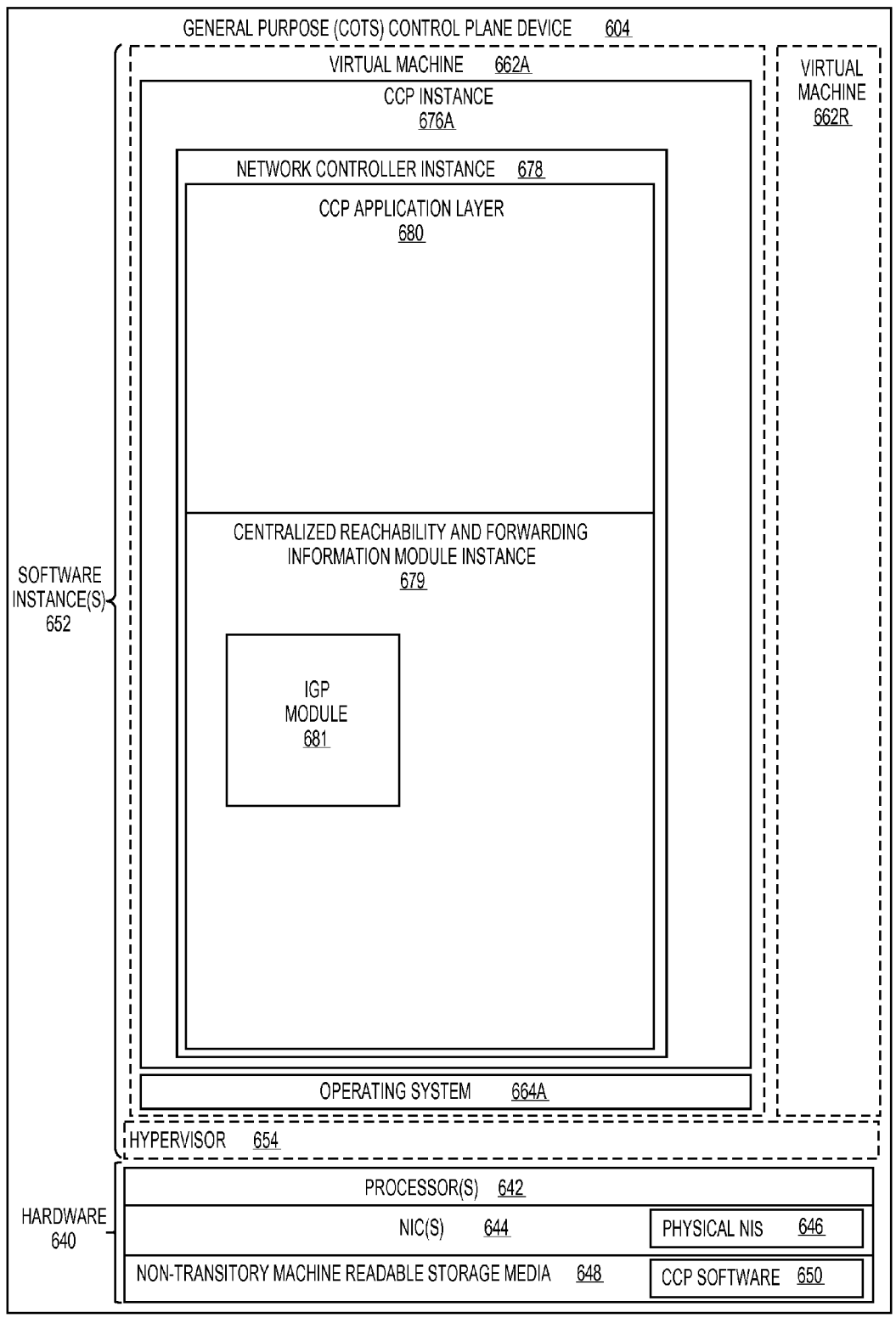
FIG. 6 illustrates a general purpose control plane device 604 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

FIG. 4 is a diagram of one embodiment of a network device implementing the LFA computation process in a network or autonomous system.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 401 or network device or similar computing device. The router 401 can have any structure that enables it to receive data traffic and forward it toward its destination. The router 401 can include a network processor 403 or set of network processors that execute the functions of the router 401. A 'set,' as used herein, is any positive whole number of items including one item. The router 401 or network element can execute IGP and LFA computation functionality via a network processor 403 or other components of the router 401.

The IGP and LFA functions can be implemented as modules in any combination of software, including firmware, and hardware within the router. The functions of the IGP process that are executed and implemented by the router 401 include those described further herein above.

In one embodiment, the router 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the IGP and LFA process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the IGP and LFA process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). The IPG module 533A implements the processes described herein above including LFA computation as part of the Control communication and Configuration Module 532A or similar aspect of the networking software, which may be loaded and stored in the non-transitory machine readable media 518A or in a similar location.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R. In one embodiment, the virtual machines 532A-R may execute the described IGP module 563A and related software described herein above.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 5C illustrates various exemplary ways in which VNEs may be coupled according to some embodiments of the invention. FIG. 5C shows VNEs 570A.1-570A.P (and optionally VNEs 580A.Q-580A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/

MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 172 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the IGP module 681 and related software as described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 174 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 684 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 704.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 678 to the operating system 664A and communicating with the various NEs), and an CCP application layer 680 (sometimes referred to as an application layer) over the middleware layer (providing the intelligence required for various network operations such as protocols, network situational awareness, and user-interfaces). In one embodiment, the centralized reachability and forwarding information module 679 may include the IGP module 681 and related software as described herein above.

At a more abstract level, this CCP application layer 680 within the centralized control plane 676 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a network having a plurality of nodes, the method to calculate a loop free alternative (LFA) next hop as a backup for a next hop of a primary path for an interior gateway protocol (IGP), where the method enables consideration of the LFA next hop where a link to the next hop has a reverse cost that has a maximum value, where the maximum value is a maximum link metric defined for the network, a forward cost is a metric for an outbound direction from the network device on the link, the reverse cost is a metric for an inbound direction toward the network device on the link, the method comprising the steps of:

selecting a next candidate next hop from a set of candidate next hops in the network;

checking whether a link to the next candidate next hop is an administratively allowable link;

checking whether the link has a maximum forward cost, where the maximum forward cost is a value defined for the network as a maximum possible value for a forward link cost;

checking whether the link is bi-directional;

computing LFA using the next candidate next hop where the link is administratively allowable link, where the link does not have the maximum forward cost, where the link is bi-directional, and where the link is considered for the LFA when the link has a reverse cost with the maximum value; and updating a local routing information base of the network device to enable forwarding of data traffic using the computed LFA where the primary path has failed.

2. The method of claim 1, further comprising the step of:
checking whether a neighbor node corresponding to the link is overloaded where the IGP is intermediate system-intermediate system (IS-IS).

3. The method of claim 1, further comprising the step of:
checking whether the set of candidate next hops has been exhausted.

4. The method of claim 1, wherein the maximum forward cost is defined by intermediate system to intermediate system (IS-IS).

5. The method of claim 1, wherein the maximum forward cost is defined by open shortest path first (OSPF).

6. The method of claim 1, wherein the IGP is for internet protocol version 4 (IPv4).

7. The method of claim 1, wherein the IGP is for internet protocol version 6 (IPv6).

8. A network device in a network having a plurality of nodes, the network device to implement a method to calculate a loop free alternative (LFA) next hop as a backup for a next hop of a primary path for an interior gateway protocol (IGP), where the method enables consideration of the LFA next hop where a link to the next hop has a reverse cost that has a maximum value, where the maximum value is a maximum link metric defined for the network, a forward cost is a metric for an outbound direction from the network device on the link, the reverse cost is a metric for an inbound direction toward the network device on the link, the network device comprising:

a non-transitory storage medium to store networking software; and a network processor communicatively coupled to the non-transitory storage medium, the network processor configured to execute an IGP module, the IGP module configured to select a next candidate next hop from a set of candidate next hops in the network, to check whether a link to the next candidate next hop is an administratively allowable link, to check whether the link has a maximum forward cost, where the maximum forward cost is a value defined for the network as a maximum possible value for a forward link cost, to check whether the link is bi-directional, to compute LFA using the next candidate next hop where the link is administratively allowable link, the link does not have the maximum forward cost and the link is bi-directional, and where the link is considered for the LFA when the link has a reverse cost with the maximum value, and to update a local routing information base of the network device to enable forwarding of data traffic using the computed LFA where the primary path has failed.

9. The network device of claim 8, wherein the network processor is further configured execute the IGP module and to check whether a neighbor node corresponding to the link is overloaded where the IGP is intermediate system-intermediate system (IS-IS).

10. The network device of claim 8, wherein the network processor is further configured execute the IGP module and check whether the set of candidate next hops has been exhausted.

11. The network device of claim 8, wherein the maximum forward cost is defined by intermediate system to intermediate system (IS-IS).

12. The network device of claim 8, wherein the maximum forward cost is defined by open shortest path first (OSPF).

13. The network device of claim 8, wherein the IGP is for internet protocol version 4 (IPv4).

14. The network device of claim 8, wherein the IGP is for internet protocol version 6 (IPv6).

15. A control plane device configured to implement at least one centralized control plane for a software defined network (SDN), the centralized control plane configured to calculate a loop free alternative (LFA) next hop as a backup for a next hop of a primary path for an interior gateway protocol (IGP), where the centralized control plane enables consideration of the LFA next hop where a link to the next hop has a reverse cost that has a maximum value, where the maximum value is a maximum link metric defined for a network, a forward cost is a metric for an outbound direction from a network device on the link, the reverse cost is a metric for an inbound direction toward the network device on the link, the control plane device comprising:

a non-transitory storage medium to store centralized control plane software and an IGP module; and a processor communicatively coupled to the non-transitory storage medium, the processor configured to execute the control plane software to implement the IGP module, the IGP module configured to select a next candidate next hop from a set of candidate next hops in the network, to check whether a link to the next candidate next hop is an administratively allowable link, to check whether the link has a maximum forward cost, where the maximum forward cost is a value defined for the network as a maximum possible value for a forward link cost, to check whether the link is bi-directional, to compute LFA using the next candidate next hop where the link is administratively allowable link, the link does not have the maximum forward cost and the link is bi-directional, and where the link is considered for the LFA when the link has a reverse cost with the maximum value, and to update a local routing information base of the network device to enable forwarding of data traffic using the computed LFA where the primary path has failed.

16. The control plane device of claim 15, wherein the processor is further configured execute the IGP module and to check whether a neighbor node corresponding to the link is overloaded where the IGP is intermediate system-intermediate system (IS-IS).

17. The control plane device of claim 15, wherein the processor is further configured execute the IGP module and check whether the set of candidate next hops has been exhausted.

18. The control plane device of claim 15, wherein the IGP is for internet protocol version 4 (IPv4).

19. The control plane device of claim 15, wherein the IGP is for internet protocol version 6 (IPv6).

20. A computing device implementing a plurality of virtual machines for implementing network function virtualization (NFV), wherein a virtual machine from the plurality of virtual machines is configured to calculate a loop free alternative (LFA) next hop as a backup for a next hop of a primary path for an interior gateway protocol (IGP), where the NFV enables consideration of the LFA next hop where a link to the next hop has a reverse cost that has a maximum value, where the maximum value is a maximum link metric defined for a network, a forward cost is a metric for an outbound direction from a network device on the link, the reverse cost is a metric for an inbound direction toward the network device on the link, the computing device comprising:

a non-transitory storage medium to store an IGP module; and a processor communicatively coupled to the non-transitory storage medium, the processor configured to execute the IGP module, the IGP module configured to select a next candidate next hop from a set of candidate next hops in the network, to check whether a link to the next candidate next hop is an administratively allowable link, to check whether the link has a maximum forward cost, where the maximum forward cost is a value defined for the network as a maximum possible value for a forward link cost, to check whether the link is bi-directional, to compute LFA using the next candidate next hop where the link is administratively allowable link, the link does not have the maximum forward cost and the link is bi-directional, and where the link is considered for the LFA when the link has a reverse cost with the maximum value, and to update a local routing information base of the network device to enable forwarding of data traffic using the computed LFA where the primary path has failed.

21. The computing device of claim 20, wherein the processor is further configured execute the IGP module and to check whether a neighbor node corresponding to the link is overloaded where the IGP is intermediate system-intermediate system (IS-IS).

22. The computing device of claim 20, wherein the processor is further configured execute the IGP module and check whether the set of candidate next hops has been exhausted.

23. The computing device of claim 20, wherein the maximum forward cost is defined by open shortest path first (OSPF).

24. The computing device of claim 20, wherein the IGP is for internet protocol version 4 (IPv4).

25. The computing device of claim 20, wherein the IGP is for internet protocol version 6 (IPv6).

* * * * *